US012791397B2

(12) United States Patent
Schuetz et al.

(10) Patent No.: US 12,791,397 B2
(45) Date of Patent: Nov. 10, 2026

(54) PERSISTENT TEMPERATURE INDICATOR FOR AN ELECTRICAL CONNECTOR

(71) Applicant: Eaton Intelligent Power Limited, Dublin (IE)

(72) Inventors: Robert Raymond Schuetz, Waukesha, WI (US); Nicholas John Wainio, Wales, WI (US)

(73) Assignee: Eaton Intelligent Power Limited, Dublin (IE)

( * ) Notice: Subject to any disclaimer, the term of this patent is extended or adjusted under 35 U.S.C. 154(b) by 233 days.

(21) Appl. No.: 18/400,512

(22) Filed: Dec. 29, 2023

(65) Prior Publication Data

US 2024/0255355 A1 Aug. 1, 2024

Related U.S. Application Data

(60) Provisional application No. 63/442,206, filed on Jan. 31, 2023.

(51) Int. Cl.
*H01R 13/66* (2006.01)
*G01K 1/02* (2021.01)
(Continued)

(52) U.S. Cl.
CPC ............. *G01K 3/005* (2013.01); *G01K 1/028* (2013.01); *H01R 13/6581* (2013.01)

(58) Field of Classification Search
CPC .......... G01K 3/005; G01K 1/028; G01K 1/02; G01K 3/04; G01K 11/12; G01K 1/04;
(Continued)

(56) References Cited

U.S. PATENT DOCUMENTS 4,152,643 A 5/1979 Schweitzer, Jr.
5,479,350 A * 12/1995 Barakchi ................. G07C 3/00 374/170
(Continued)

FOREIGN PATENT DOCUMENTS

CN 103983377 A 8/2014
CN 203848955 U 9/2014
(Continued)

OTHER PUBLICATIONS

Chrissanthi Choulouilidou, European Patent Office, International Search Report and Written Opinion, counterpart PCT Application No. PCT/EP2024/025046, mailed May 3, 2024, 16 pages total.
(Continued)

*Primary Examiner* — Abdullah A Riyami
*Assistant Examiner* — Nelson R. Burgos-Guntin
(74) *Attorney, Agent, or Firm* — DiBerardino McGovern IP Group LLC

(57) ABSTRACT

A system includes: an electrical connector that includes: an electrically insulating housing that defines an interior region; a conductive shell on the insulating housing; and an electrical conductor in the interior region. The system also includes a thermal sensing apparatus that includes: a temperature sensor; and a temperature display visible from an exterior of the electrical connector. The temperature display is configured to provide a persistent indication of a maximum temperature measured by the temperature sensor after the temperature measured by the temperature sensor has decreased relative to the maximum.

22 Claims, 6 Drawing Sheets

(51) Int. Cl.
*G01K 3/00* (2006.01)
*H01R 13/6581* (2011.01)

(58) Field of Classification Search
CPC . H01R 13/6581; H01R 13/53; H01R 13/6683
See application file for complete search history.

(56) References Cited

U.S. PATENT DOCUMENTS

| | | | | |
|---|---|---|---|---|
| 2019/0168572 | A1* | 6/2019 | Kuo | B60H 1/00585 |
| 2021/0356328 | A1* | 11/2021 | Ferraro | G01K 1/02 |
| 2023/0009735 | A1* | 1/2023 | Barrett | H01R 13/6683 |

FOREIGN PATENT DOCUMENTS

| | | | |
|---|---|---|---|
| DE | 202021004014 | U1 | 5/2022 |
| ES | 175946 | U | 7/1972 |
| FR | 2122274 | A5 | 8/1972 |
| WO | 2015151039 | A1 | 10/2015 |

OTHER PUBLICATIONS

Installation & Operating Instructions 161LR (without test point) & 162LR (with test point) Loadbreak Elbow Connectors, ABB corporate website, Mar. 29, 2019, 5 pages total.

* cited by examiner

PERSISTENT TEMPERATURE INDICATOR FOR AN ELECTRICAL CONNECTOR

CROSS-REFERENCE TO RELATED APPLICATION

This application claims the benefit of U.S. Provisional Application No. 63/442,206, filed on Jan. 31, 2023, and titled PERSISTENT TEMPERATURE INDICATOR FOR AN ELECTRICAL CONNECTOR, which is incorporated herein by reference in its entirety.

TECHNICAL FIELD

This disclosure relates to a persistent temperature indicator for an electrical connector, and an electrical connector with a persistent temperature indicator.

BACKGROUND

An electrical connector is used to connect electrical transmission and distribution equipment and electrical sources within a high-voltage electrical system.

SUMMARY

In one aspect, a system includes: an electrical connector that includes: an electrically insulating housing that defines an interior region; a conductive shell on the insulating housing; and an electrical conductor in the interior region. The system also includes a thermal sensing apparatus that includes: a temperature sensor; and a temperature display visible from an exterior of the electrical connector. The temperature display is configured to provide a persistent indication of a maximum temperature measured by the temperature sensor after the temperature measured by the temperature sensor has decreased relative to the maximum.

Implementations may include one or more of the following features.

The temperature display may include an analog dial and a temperature scale, and, in these implementations, the dial remains at a position associated with the maximum temperature measured by the temperature sensor after the temperature measured by the temperature sensor decreases. In some implementations, the dial moves relative to the temperature scale only when the temperature measured by the temperature sensor increases.

The temperature display may include a thermal indicator that has a plurality of changeable display characteristics; each of the plurality of changeable display characteristics may correspond to one of a plurality of ranges of temperatures; each changeable display characteristic may be configured to transition to a changed visual appearance in response to the temperature sensor measuring a temperature in the corresponding range of temperatures; and each changeable display characteristic may be configured to maintain its changed visual appearance after transitioning to the changed visual appearance. Each changed visual appearance may be a different color. The thermal indicator may include a thermally reactive material, the thermally reactive material may include a plurality of substances, and each substance may be configured to produce one of the different colors.

The electrically insulating housing also may include a connection interface that extends through the conductive shell, and the thermal sensing apparatus may be attached to the electrically insulating housing at the connection interface with the temperature display facing outward relative to the interior region. The thermal sensing apparatus may be removably attached to the connection interface.

The temperature sensor may measure a temperature in the electrical connector that varies with the temperature of the electrical conductor such that the maximum temperature measured by the temperature sensor is an indication of the maximum temperature of the electrical connector.

The temperature sensor may measure a temperature in the electrical connector that varies with the temperature of the electrical conductor such that the maximum temperature measured by the temperature sensor is an indication of the maximum temperature of the electrical conductor.

The temperature sensor may measure an ambient temperature of an environment that surrounds the electrical connector.

The temperature sensor may measure a temperature of the insulating housing.

At least part of the temperature sensor may be in the insulating housing.

The thermal sensing apparatus may include an apparatus housing, and the temperature display is visible from the exterior of the apparatus housing.

The temperature sensor may be a thermocouple.

In another aspect, a thermal sensing apparatus includes: a housing; a temperature sensor; a temperature display visible from an exterior of the housing, the temperature display configured to provide a persistent indication of a maximum temperature measured by the temperature sensor after the temperature measured by the temperature sensor has decreased relative to the maximum temperature; and a connection interface configured to attach the housing to a corresponding interface on an electrical connector. When the housing is attached to the electrical connector, the temperature measured by the temperature sensor is associated with the electrical connector.

Implementations may include one or more of the following features.

The temperature display may include an analog dial and a temperature scale, and, in these implementations, the dial remains at a position associated with the maximum temperature measured by the temperature sensor after the temperature measured by the temperature sensor decreases. In some implementations, the dial moves relative to the temperature scale only when the temperature measured by the temperature sensor increases.

The connection interface may be configured to attach to an insulated housing of the electrical connector.

Implementations of any of the techniques described herein may include a system, an assembly, an electrical connector, and/or a method. The details of one or more implementations are set forth in the accompanying drawings and the description below. Other features will be apparent from the description and drawings, and from the claims.

DRAWING DESCRIPTION

DETAILED DESCRIPTION

An electrical connector 110 with a thermal sensing apparatus 180 that tracks a maximum temperature associated with the electrical connector 110 is disclosed.

Figure 1:
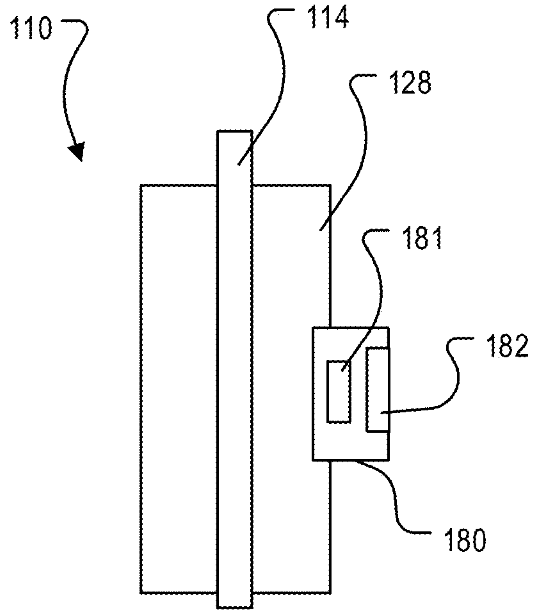
FIG. 1 is a cross-sectional block diagram of an electrical connector.

FIG. 1 is a cross-sectional block diagram of the electrical connector 110. The electrical connector 110 includes an electrical conductor 114, a housing 128 that surrounds the electrical conductor 114, and the thermal sensing apparatus 180. The thermal sensing apparatus 180 includes a temperature display 182 that provides a persistent indication of the maximum temperature measured by a temperature sensor 181. The temperature display 182 is visible from the exterior of the electrical connector 110.

Figures 2A, 2B, 2C:
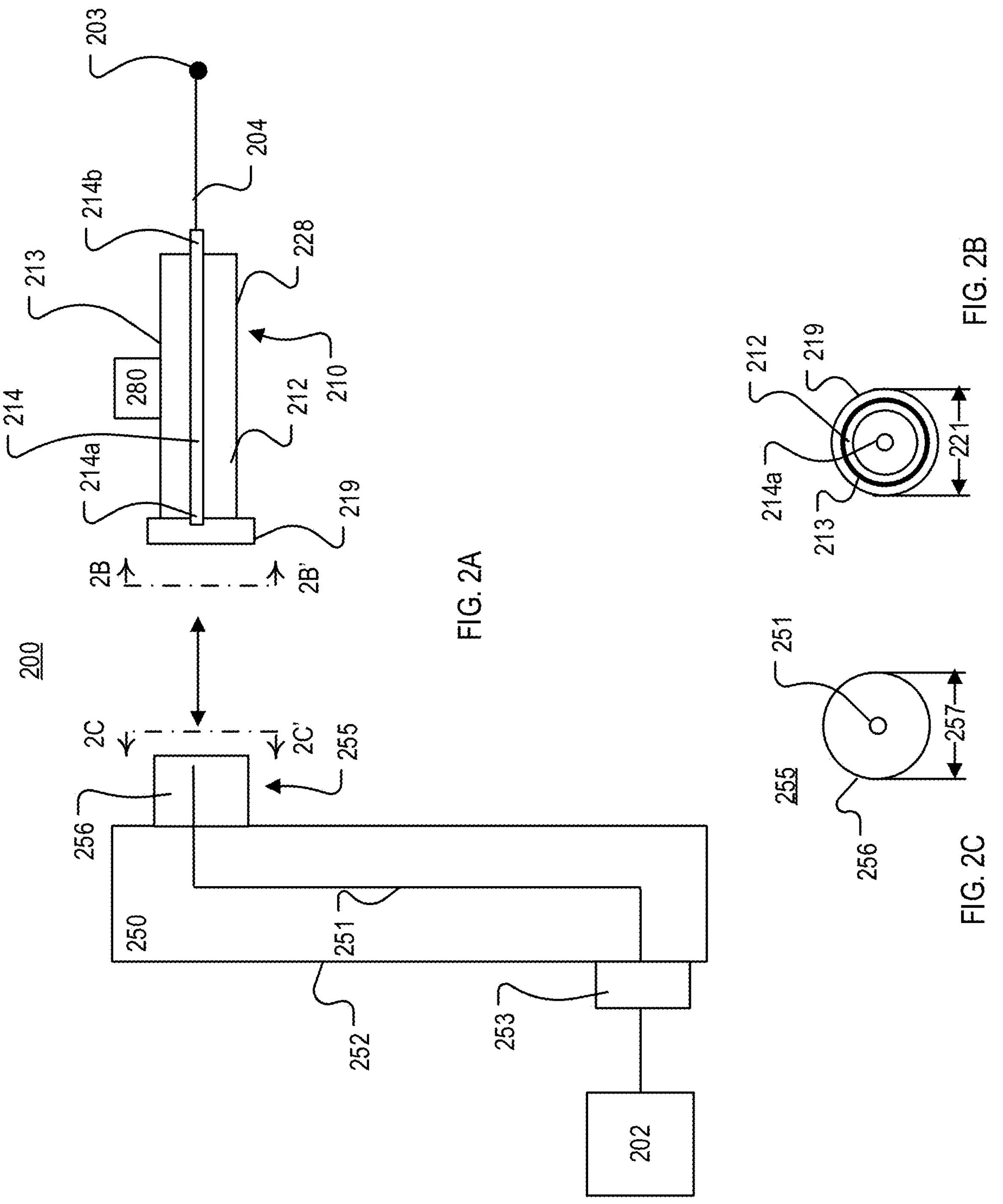
FIG. 2A is a block diagram of an alternating-current (AC) electrical power distribution network or electrical power system that includes an electrical connector.
FIG. 2B is an end view of the electrical connector of FIG. 2A taken along line 2B-2B' of FIG. 2A.
FIG. 2C shows a bushing taken along the line 2C-2C' of FIG. 2A.

The electrical connector 110 may be, for example, a separable electrical connector that is configured to be repeatedly connected to and disconnected from an external electrical power device, such as the power device 250 of FIG. 2A. The electrical connector 110 may be, for example, a loadbreak connector, a deadbreak connector, a T-connector, a termination connector, or an underground termination connector. When the electrical connector 110 is mounted to the bushing of the power device, the electrical conductor 114 is electrically connected to the power device and electrical current may flow in the electrical conductor 114.

In operational use, the electrical connector 110 may be temporarily exposed to abnormally high temperatures during a thermal event. An abnormally high temperature is a temperature that exceeds the rated temperature of the electrical conductor 114 and is likely to result in damage to or destruction of the electrical connector 110 and/or the electrical conductor 114. Examples of thermal events include, without limitation, fires in the electrical connector 110, fires near the electrical connector 110, and/or fault conditions in the power device. Fires in or near the electrical connector 110 expose the housing 128 and the conductor 114 to abnormally high temperatures and may melt or otherwise degrade or damage the housing 128 and/or the conductor 114. Faults in the power device may generate large transient currents that flow in the conductor 114, and these large currents may damage the conductor 114 and/or the housing 128.

The thermal sensing apparatus 180 provides a persistent indication of the maximum temperature measured by the temperature sensor 181 at the temperature display 182. The temperature sensor 181 is any type of device that is capable of measuring temperature and producing an indication of the measured temperature. For example, the temperature sensor 181 may be a thermometer, a thermocouple, a thermistor, a resistance temperature detector (RTD), or a semiconductor based integrated circuit.

The temperature sensor 181 is coupled to the display 182, and the display 182 presents a visual indication that represents the maximum temperature measured by the temperature sensor 181. The display 182 is visible from the exterior of the electrical connector 110. The display 182 may be, for example, an analog dial positioned relative to a fixed numerical temperature scale. In these implementations, the analog dial is configured to only move in one direction such that the dial remains in a position that shows the maximum (or highest) temperature measured by the temperature sensor 181 even after the thermal event ends. In some implementations, the display 182 includes a plurality of display characteristics, each of which is associated with one or more temperature values or a range of temperature values. The display characteristics may be, for example, a plurality of colors, with each one of the colors being associated with one or more specific temperature values.

In some implementations, the temperature sensor 181 and the display 182 are a single component. For example, the temperature sensor 181 and the temperature display 182 may be implemented together as a thermally reactive material that is attached to an exterior surface of the housing 128 and changes color permanently after being in the presence of a certain temperature. An irreversible inorganic thermochrome, such as, for example, copper iodide, may be used as the thermally reactive material. In another example, a water-based thermochromic ink that changes color when leuco dye and color developer mix when a sensitizer melts, may be used as the thermally reactive material. A leuco dye is a dye which can switch between two chemical forms; one of which is colorless. A sensitizer is a substance that increase the heat sensitivity of the dye. More than one thermally reactive material may be used to create a multi-color temperature scale.

The persistent indication provided by the thermal sensing apparatus 180 allows the health status of the electrical connector 110 and/or the electrical conductor 114 to be assessed via visual inspection after the thermal event ends. Furthermore, the persistent indication also facilitates assessment of the health status and determination of whether or not to repair and/or replace the electrical connector 110 and/or the electrical conductor 114 without having to disassemble and/or closely inspect the electrical connector 110. Moreover, the thermal sensing apparatus 180 provides a simple and efficient approach to thermal monitoring of the electrical connector 110. For example, some prior approaches use expensive and/or complex separate instruments, such as thermal cameras, to provide real-time or near-real time thermal monitoring of an electrical device. However, these instruments may be expensive and costly to maintain, and may be damaged during the thermal event. Furthermore, these instruments typically do not store historical data. Moreover, these prior approaches rely on analysis of data from the instruments to determine whether the electrical device has been damaged, and the analysis adds complexity. On the other hand, the thermal sensing apparatus 180 provides a simple, safe, and efficient thermal monitoring approach in a single, compact, integrated unit that also provides historical data in the form of the maximum temperature recorded or maximum temperature range reached.

FIG. 2A is a block diagram of an alternating-current (AC) electrical power distribution network or electrical power system 200 that includes an electrical connector 210. The electrical connector 210 is an implementation of the electrical connector 110. The electrical connector 110 may be used in the power system 200 instead of or in addition to the electrical connector 210.

The electrical power system 200 may be, part of, for example, an electrical grid, an electrical system, or a multiphase electrical network that provides electricity to industrial, commercial and/or residential customers. The electrical grid may have an operating voltage of, for example, at least 1 kilovolt (kV), 12 kV, up to 34.5 kV, up to 38 kV, or 69 kV or higher, and may operate at a system frequency of, for example, 50 or 60 Hertz (Hz). All or part of the electrical power system 200 may be in an overhead power system configuration and/or in an underground power system configuration. Moreover, the electrical power system 200 may include additional components and systems that are not shown. For example, the electrical power system 200 may include cabinets, transformers, transmission lines and cables, substations, and support structures, just to name a few.

The electrical connector 210 is a separable or movable electrical connector that may be connected to and disconnected from the power device 250. The electrical connector 210 may be, for example, a loadbreak elbow connector or a T-shaped deadbreak connector. The electrical connector 210 includes a thermal sensing apparatus 280 that provides an indication of the maximum temperature measured by the temperature sensor in the apparatus 280. The thermal sensing apparatus 280 includes a temperature sensor similar to the temperature sensor 181 and a temperature display similar to the temperature display 182.

The power device 250 may be, for example, a transformer, a switching apparatus, a junction, or a sectionalizing cabinet. The power device 250 may be underground or overhead. The power device 250 is electrically connected to an AC electrical source 202 through a source-side path 251. The source-side path 251 is any type of device capable of distributing electricity. For example, the source-side path 251 may be a transmission line, a metallic rod or wire, an electrical cable, or a combination of such devices. The source-side path 251 enters a housing 252 of the power device 250 at a first bushing 253, which is insulated and protects the source-side path 251. The power device 250 also includes a second bushing 255. The source-side path 251 passes through and is protected by the bushing 255. Separate devices (such as the electrical connector 210) may be electrically connected to the source-side path 251 by mounting the separate device to the bushing 255.

The electrical connector 210 includes a housing 228, which includes an insulating housing 212 that is covered by a conductive shield 213. The housing 228 defines a mechanical interface 219 configured for connection to and disconnection from the bushing 255. Referring also to FIG. 2B, which is an end view of the electrical connector 210 taken along line 2B-2B' of FIG. 2A, the insulating housing 212 has a circular shaped cross section in the plane shown in FIG. 2B. The cross-section of the insulating housing 212 may have other shapes. The insulating housing 212 is made of any electrically insulating material. For example, the insulating housing 212 may be made of ethylene propylene diene monomer (EPDM) rubber, any rubber material, silicone, a polymer, a hardened or solidified foam, and/or hardened epoxy.

The conductive shield 213 is on an outer surface of the insulating housing 212. The shield 213 is made of any electrically conductive or semiconductive material. For example, the conductive shield 213 may be made of cured EPDM doped with an electrically conductive material. The electrical connector 210 may be implemented without the shield 213.

Referring also to FIG. 2C, which is a view of the bushing 255 taken along the line 2C-2C' of FIG. 2A, the bushing 255 includes an insulating housing 256. The insulating housing 256 has the same cross-sectional shape as the interface 219 (a circle in this example) and a diameter 257. The mechanical interface 219 of the electrical connector 210 has a diameter 221 that is slightly smaller than the diameter 257. The mechanical interface 219 is connected to the bushing 255 by fitting the interface 219 over the housing 256 and pressing the interface 219 toward the power device 250 until the interface 219 is secured to the housing 256. The interface 219 may be held to the housing 256 by, for example, an interference or frictional fit.

As shown in FIG. 2A, the electrical conductor 214 of the electrical connector 210 extends from a first end 214*a* to a second end 214*b*. The first end 214*a* is accessible through the interface 219. When the interface 219 is connected to the bushing 255, the first end 214*a* of the electrical conductor 214 is electrically connected to the source-side path 251. The end 214*b* is electrically connected to a load-side path 204. The load-side path 204 may be, for example, an electrical cable or any other mechanism for conducting electricity. In the example shown in FIG. 2A, the load-side path 204 is electrically connected to a node 203. When the mechanical interface 219 is connected to the bushing 255, the source 202 is electrically connected to the node 203 and current flows in the conductor 214.

Figure 3A:
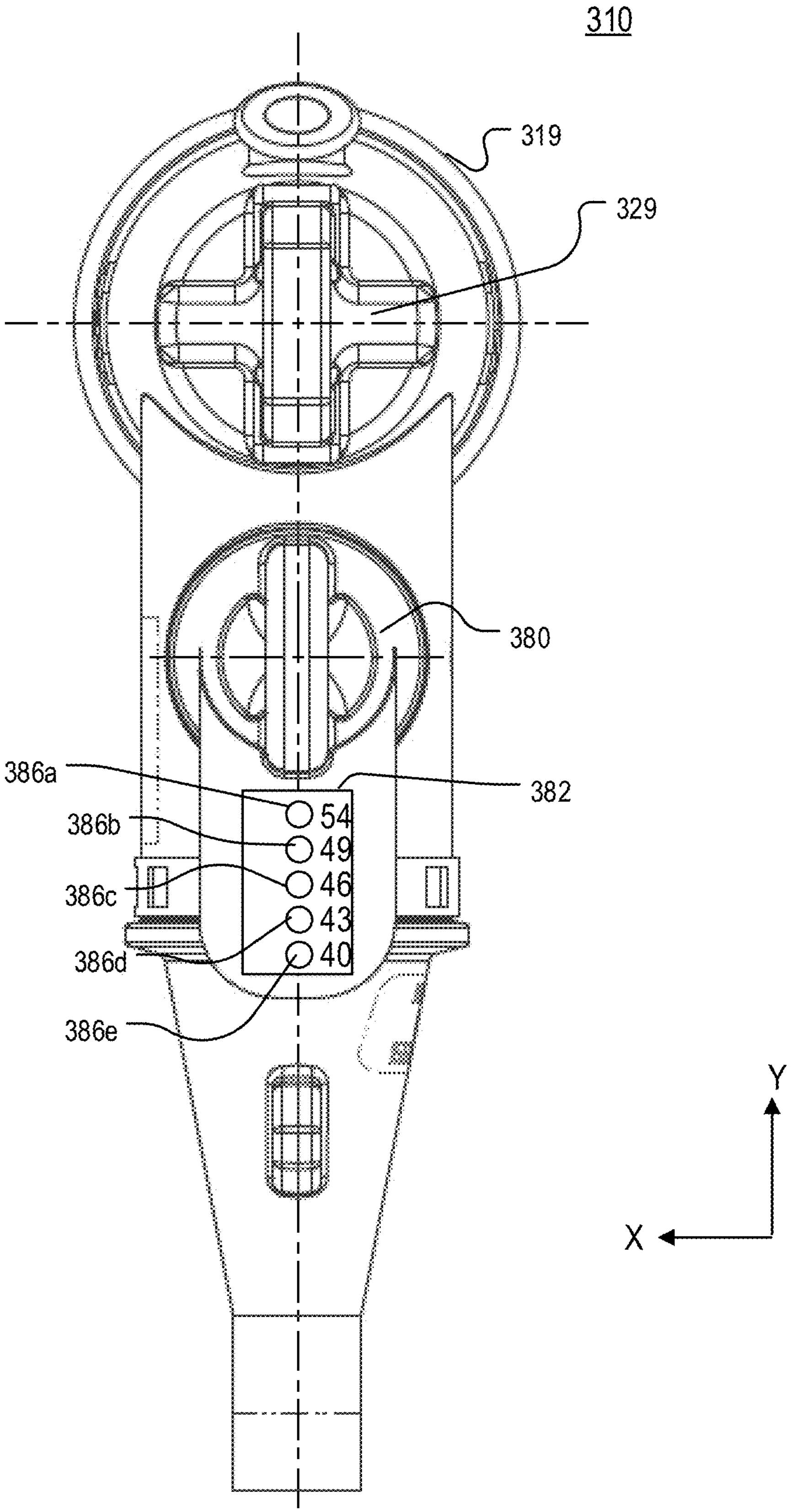
FIG. 3A is a rear exterior view of an electrical connector in the X-Y plane.
Figure 3B:
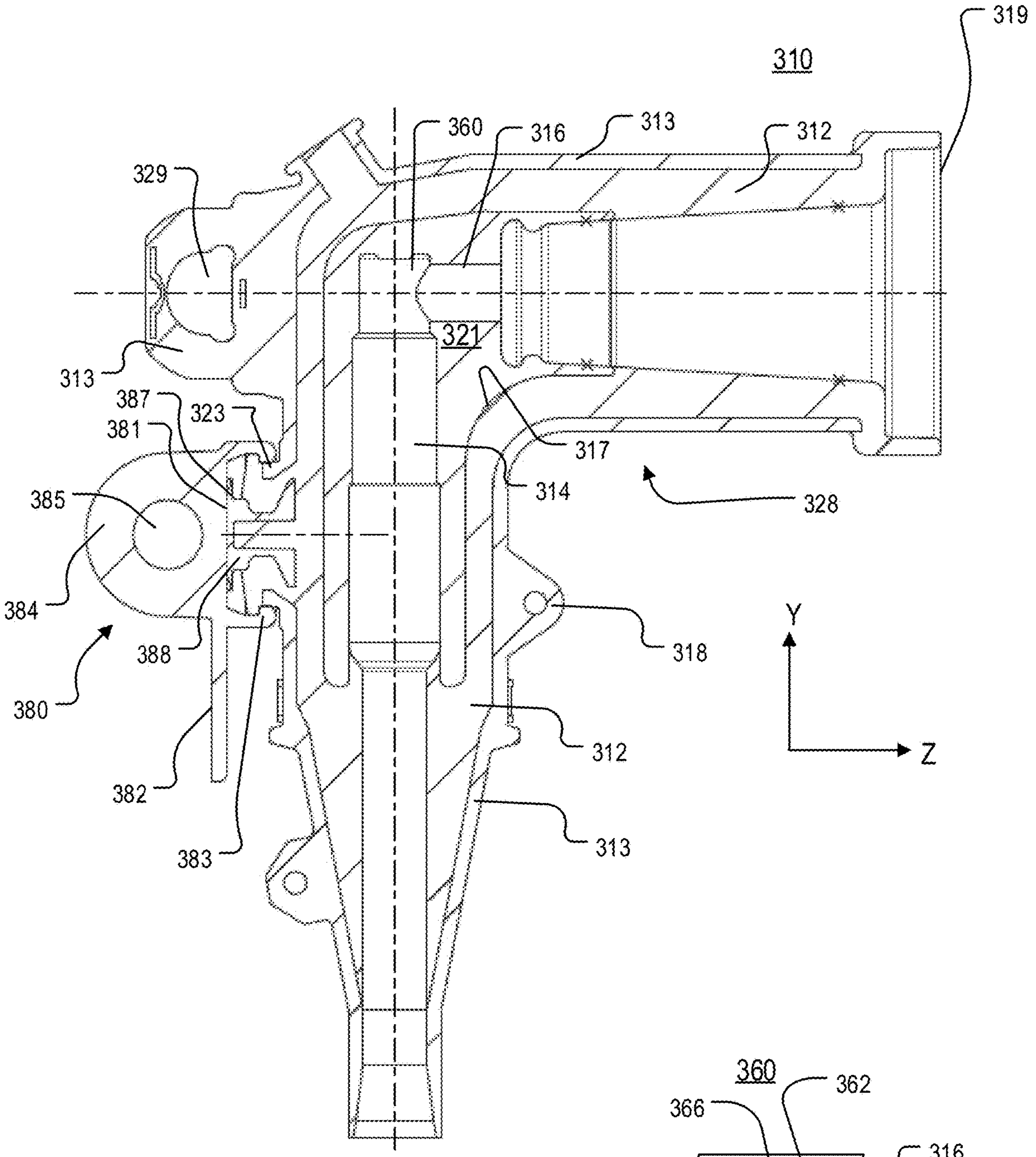
FIG. 3B is a side cross-sectional view of the electrical connector of FIG. 3A in the Y-Z plane.

FIG. 3A is a rear exterior view of an electrical connector 310 in the X-Y plane. FIG. 3B is a side cross-sectional view of the electrical connector 310 in the Y-Z plane. The electrical connector 310 is another example of an implementation of the electrical connector 110. The electrical connector 310 includes a thermal sensing apparatus 380. The thermal sensing apparatus 380 includes a temperature display 382 and a temperature sensor 381. The temperature display 382 is visible from an exterior of a housing 384 of the thermal sensing apparatus 380. The temperature display 382 provides a persistent indication of a maximum temperature measured by the temperature sensor 381.

The electrical connector 310 is a three-dimensional structure. In the example shown, the electrical connector 310 is an elbow connector that extends along two orthogonal directions, Y and Z (FIG. 3B). The electrical connector 310 includes a housing 328 that includes insulator 312 covered by a shield 313. The housing 328 is generally L-shaped and extends in the Y and Z directions.

The shield 313 is an electrically conductive material or semiconductive material that provides a deadfront for the electrical connector 310. The shield 313 may be made of a metal or an insulating material that is doped with a conductive material. For example, the shield 313 may be made of EPDM rubber doped with a metallic substance. The shield 313 may be implemented as a coating or as a conductive element that is securely attached to the insulator 312.

The shield 313 may include one or more grounding tabs that extend outward to allow the shield to be easily connected to a grounded point. The element labeled 318 in FIG. 3B is an example of a grounding tab. The shield 313 defines a pulling eye or opening 329 sized to receive a hook or a hot stick. The shield 313 also defines a mounting interface 319 that enables the electrical connector 310 to be attached to a bushing of an external device (such as the bushing 255 of the power device 250 of FIG. 2A).

The insulator 312 is any type of electrically insulating material. Examples of materials that may be used for the insulator 312 include, without limitation, rubber, peroxide-cured EPDM rubber, or a polymer material. The insulation 312 has an interior wall or inner surface 317 that defines an interior space 321.

The electrical connector 310 also includes an electrical conductor 314 that extends in the Y direction and an electrically conductive probe 316 that extends in the Z direction. The electrical conductor 314 and the electrically conductive probe 316 are joined at a contact assembly 360.

The electrical conductor 314, the probe 316, and the assembly 360 are in the interior 321 and form a conductive path through the electrical connector 310. The conductive probe 316 extends into the interface 319 such that, when the interface 319 is connected to an external power device (such as the power device 250 of FIG. 2A), the conductive probe 316 is also electrically connected to the external device.

Figure 3C:
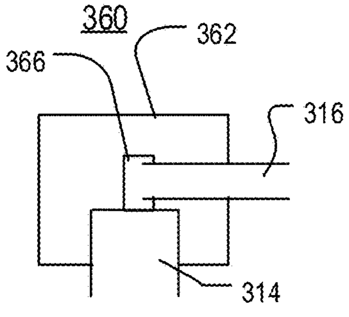
FIG. 3C is a cross-sectional view of a contact assembly.

FIG. 3C is a simplified cross-sectional view of the contact assembly 360. The contact assembly 360 includes a semi-conductive insert 362 that surrounds an electrically conductive connection junction 366. The conductor 314 and the electrically conductive probe 316 are mounted in and are electrically connected to each other at the connection junction 366. The connection junction 366 may be made of, for example, a metal such as brass or a metal alloy. The conductor 314 and the electrically conductive probe 316 may be mounted to the connection junction 366 by, for example, brazing or welding.

The shield 313 also defines a test point interface 323. The test point interface 323 extends out from the electrical connector 310. The test point interface 323 surrounds an insert cavity 388. The insert cavity 388 is a space that extends into the housing 312 toward the conductor 314 and has an end 387 that is open to an exterior of the housing 312. An electrode may be placed inserted through the end 387 and into the insert cavity 388 to allow for capacitive coupling to a voltage sensor (not shown).

The housing 384 of the thermal sensing apparatus 380 defines a connection interface 383. As shown in FIG. 3B, the connection interface 383 fits over and around the test point interface 323 to mount the thermal sensing apparatus 380 to the electrical connector 310. When the thermal sensing apparatus 380 is mounted to the test point interface 323, the temperature sensor 381 is positioned flush with the end 387 of the insert 388, and the temperature display 382 is visible from the exterior of the electrical connector 310. The temperature sensor 381 may be, for example, a thermometer, a thermocouple, a thermistor, a resistance temperature detector (RTD), or a semiconductor based integrated circuit. The temperature sensor 381 measures the temperature of the insulator 312 and the temperature of the conductor 314. Furthermore, the temperature sensor 381 also may measure the temperature of the shield 313 and/or the environment around the exterior of the electrical connector 310.

Figure 3D:
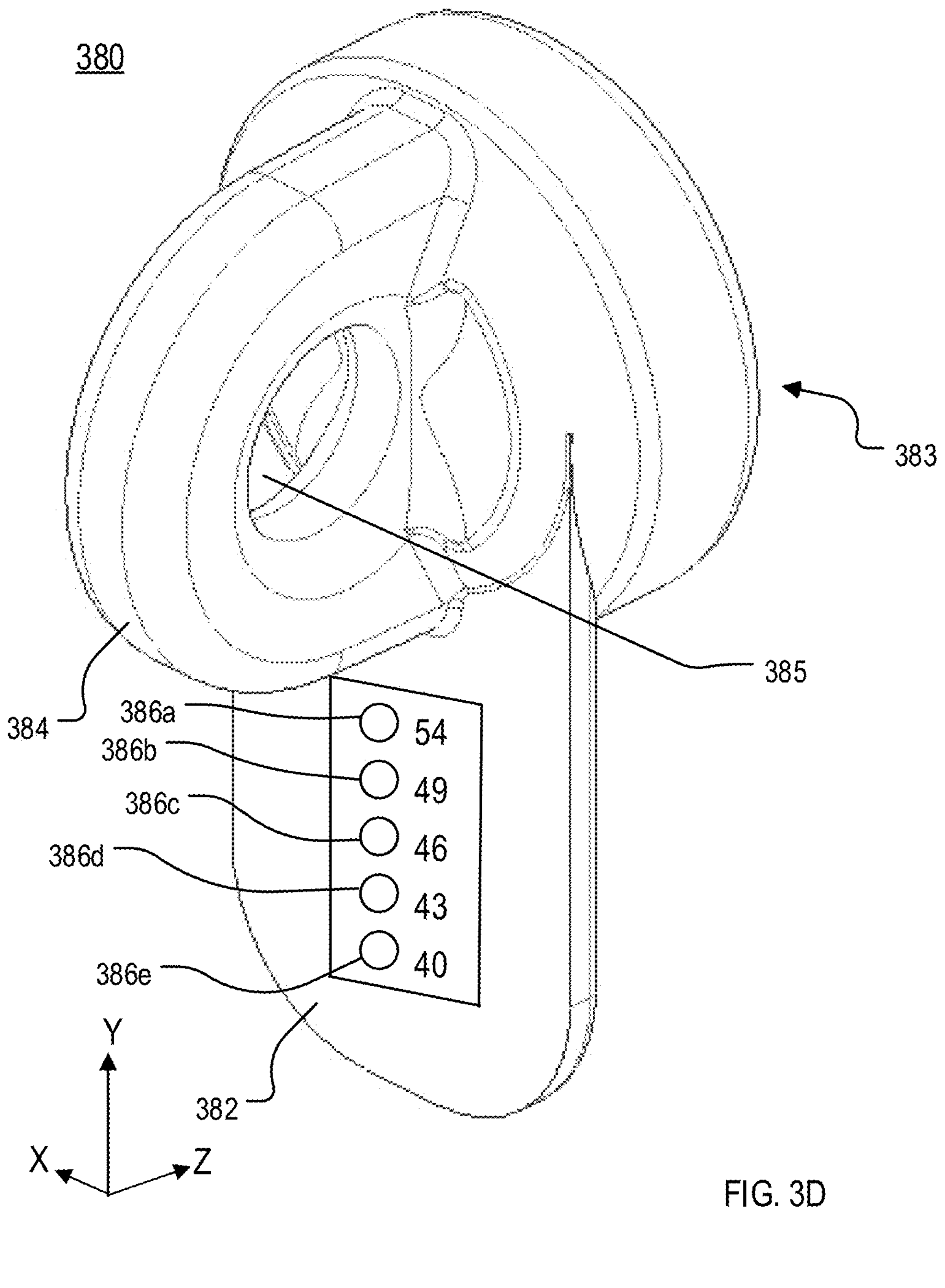
FIG. 3D is a perspective view of a thermal sensing apparatus that is not connected to an electrical connector.

The temperature display 382 is discussed in more detail with respect to FIG. 3A and FIG. 3D, which is a perspective view of the thermal sensing apparatus 380 disconnected from the electrical connector 310. The temperature display 382 includes five (5) discrete temperature steps 386*a*, 386*b*, 386*c*, 386*d*, 386*e*, each of which is associated with a maximum temperature. The five (5) maximum temperatures in the example shown in FIG. 3A are: 54° C. (130° F.), 49° C. (120° F.), 46° C. (115° F.), 43° C. (110° F.), and 40° C. (105° F.). Each step is also associated with a visible indicator that changes visual appearance to indicate that the temperature sensor 381 has measured a temperature associated with a temperature step. For example, the visible indicators may change color as compared to their original colors to show that the temperature sensor 381 measured a temperature associated with one or more of the temperature steps 386*a*-386*e*. The visible indicator is a persistent indicator that does not change back to its original visual appearance when the temperature sensor 381 begins measuring lower temperatures. For example, if the temperature step 386*e* has a changed visual appearance, then the temperature sensor 381 measured a maximum temperature of at least 40° C. but less than 43° C. If the temperature steps 386*e*, 386*d*, 386*c*, and 386*b* have the changed visual appearance, then the temperature sensor 381 measured a maximum temperature of at least 49° C. but less than 54° C. To provide another example, if all of the temperature steps 386*a*, 386*b*, 386*c*, 386*d*, 386*e* have the changed visual appearance, then the temperature sensor 381 measured a maximum temperature of 54° C. or greater.

Thus, the temperature display 382 allows an operator to quickly determine the approximate maximum temperature that the temperature sensor 381 measured. Depending on which, if any, of the temperature step(s) 386*a*, 386*b*, 386*c*, 386*d*, 386*e* have the changed visual appearance, the operator may replace the electrical connector 310, inspect the electrical connector 310 more closely, or declare that the electrical connector 310 is not compromised.

In some implementations, the thermal sensing apparatus 380 is permanently attached to the test point interface 323. However, in other implementations, the thermal sensing apparatus 380 may be removed from the test point interface 323 without damaging the thermal sensing apparatus 380 or the test point interface 323. For example, the thermal sensing apparatus 380 may be removed from the test point interface 323 by pulling an opening 385 that is formed in the housing 384. In these implementations, the test point interface 323 may be used to connect other sensing apparatuses to the electrical connector 310 when the thermal sensing apparatus 380 is not connected to the test point interface 323. For example, when the thermal sensing apparatus 380 is not connected to the test point interface 323, the test point interface 323 may be used as a traditional test point in which a conductive electrode is positioned in the insert cavity 388 insulator 312. The voltage across the electrode may be measured to detect faults and/or to determine whether the electrical connector is energized. FIG. 3D shows the thermal sensing apparatus 380 disconnected from the electrical connector 310.

Figure 4:
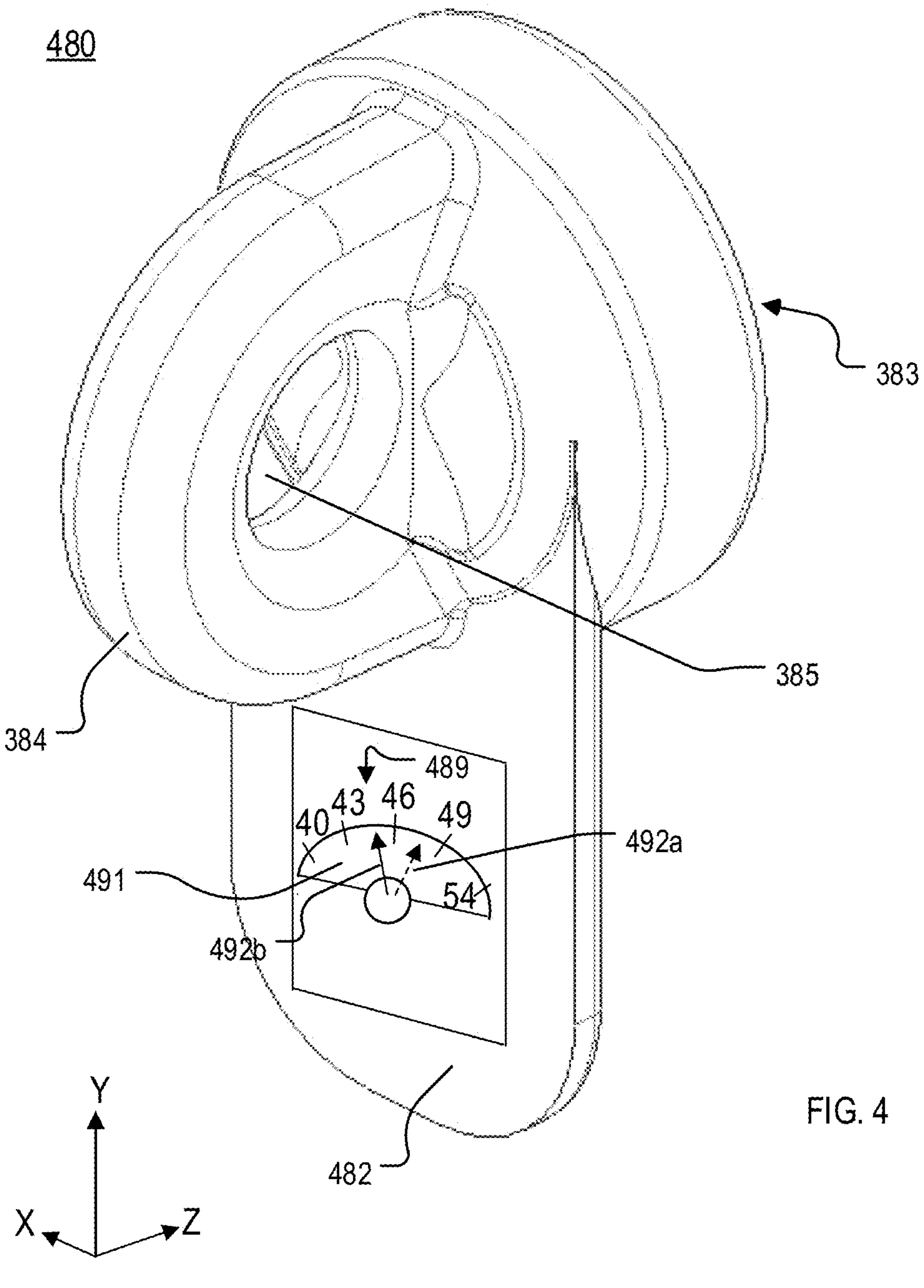
FIG. 4 is a perspective view of another thermal sensing apparatus.

These and other implementations are within the scope of the claims. Moreover, other implementations of the electrical connector 110, 210, 310 are possible. For example, the thermal sensing apparatus 380 may have a different temperature display than the temperature display 382. In some implementations, the temperature display 382 may be a dial that remains at a position that indicates the highest temperature measured by the temperature sensor 381 even after the temperature measured by the sensor 381 decreases relative to the highest temperature. FIG. 4 is an example of such an implementation.

FIG. 4 shows a perspective view of a thermal sensing apparatus 480 that is the same as the thermal sensing apparatus 380 except the thermal sensing apparatus 480 includes a dial-based temperature display 482 instead of the temperature display 382. The temperature display 482 includes an dial system 489. The analog dial 489 includes a scale 491 and dials 492*a* and 492*b* that move relative to the scale 491. In the example shown, the scale 491 includes five temperature markers labeled with a corresponding temperature value in degrees Celsius (40, 43, 46, 49, and 54 in this example). The dial 492*a* only moves clockwise relative to the scale 491. Thus, the dial 492*a* provides a persistent indication of the maximum temperature measured by the temperature sensor 481. The dial 492*b* shows the current temperature reading and can move clockwise or counter-clockwise relative to the scale 491. Although the example shown in FIG. 4 includes the dials 492*a* and 492*b*, the temperature display 482 may be implemented without the dial 492*b*.

In some implementations, the temperature display 182, 382, or 482 may be reset by the operator after the operator visually assesses the display. The temperature scales of the temperature display 382 and 482 may include temperature values other than those discussed above and shown in FIGS. 3A, 3D, and 4. Moreover, the temperature values on the temperature scales may be shown in Fahrenheit.

The electrical connector 110, 210, 310, 410 may have any rating that is appropriate for use in an AC electrical system such as the electrical power system 200. For example, the electrical connector 110, 210, 310 may be rated for 200 Amperes (A) and 15 kV, 200 A and 35 kV, 600 A and 25 kV, or 900 A and 35 kV. These ratings are provided as examples, and the electrical connector 110, 210, 310 may have a different rating.

What is claimed is:

1. A system comprising:

an electrical connector comprising: an electrically insulating housing that defines an interior region; a conductive shell on the electrically insulating housing; and an electrical conductor in the interior region; and a thermal sensing apparatus comprising:

a temperature sensor; and a temperature display visible from an exterior of the electrical connector, wherein the temperature display is configured to provide a persistent indication of a maximum temperature measured by the temperature sensor after the temperature measured by the temperature sensor has decreased relative to the maximum temperature.

2. The system of claim 1, wherein the temperature display comprises an analog dial and a temperature scale, and the analog dial remains at a position associated with the maximum temperature measured by the temperature sensor after the temperature measured by the temperature sensor decreases.

3. The system of claim 2, wherein the analog dial moves relative to the temperature scale only when the temperature measured by the temperature sensor increases.

4. The system of claim 1, wherein the temperature display comprises a thermal indicator that has a plurality of changeable display characteristics; each of the plurality of changeable display characteristics corresponds to one of a plurality of ranges of temperatures; each changeable display characteristic is configured to transition to a changed visual appearance in response to the temperature sensor measuring a temperature in the corresponding range of temperatures; and each changeable display characteristic is configured to maintain its changed visual appearance after transitioning to the changed visual appearance.

5. The system of claim 4, wherein each changed visual appearance is a different color.

6. The system of claim 5, wherein the thermal indicator comprises a thermally reactive material, the thermally reactive material comprising a plurality of substances, each substance being configured to produce one of the different colors.

7. The system of claim 1, wherein the electrically insulating housing further comprises a connection interface that extends through the conductive shell, and the thermal sensing apparatus is attached to the electrically insulating housing at the connection interface with the temperature display facing outward relative to the interior region.

8. The system of claim 7, wherein the thermal sensing apparatus is removably attached to the connection interface.

9. The system of claim 1, wherein the temperature sensor measures a temperature in the electrical connector that varies with the temperature of the electrical conductor such that the maximum temperature measured by the temperature sensor is an indication of the maximum temperature of the electrical connector.

10. The system of claim 1, wherein the temperature sensor measures a temperature in the electrical connector that varies with the temperature of the electrical conductor such that the maximum temperature measured by the temperature sensor is an indication of the maximum temperature of the electrical conductor.

11. The system of claim 1, wherein the temperature sensor measures an ambient temperature of an environment that surrounds the electrical connector.

12. The system of claim 1, wherein the temperature sensor measures an ambient temperature of an environment that surrounds the electrical connector and a temperature internal to the electrical connector.

13. The system of claim 1, wherein the temperature sensor measures a temperature of the electrically insulating housing.

14. The system of claim 1, wherein at least part of the temperature sensor is in the electrically insulating housing.

15. The system of claim 1, wherein the thermal sensing apparatus comprises an apparatus housing, and the temperature display is visible from the exterior of the apparatus housing.

16. The system of claim 1, wherein the temperature sensor comprises a thermocouple.

17. A thermal sensing apparatus comprising:

a housing;

a temperature sensor;

a temperature display visible from an exterior of the housing, the temperature display configured to provide a persistent indication of a maximum temperature measured by the temperature sensor after the temperature measured by the temperature sensor has decreased relative to the maximum temperature; and a connection interface configured to attach the housing to a corresponding interface on an electrical connector, wherein, when the housing is attached to the electrical connector, the temperature measured by the temperature sensor is associated with the electrical connector.

18. The thermal sensing apparatus of claim 17, wherein the temperature display comprises an analog dial and a temperature scale, and the analog dial remains at a position associated with the maximum temperature measured by the temperature sensor after the temperature measured by the temperature sensor decreases.

19. The thermal sensing apparatus of claim 18, wherein the analog dial moves relative to the temperature scale only when the temperature measured by the temperature sensor increases.

20. The thermal sensing apparatus of claim 17, wherein the connection interface is configured to attach to an insulated housing of the electrical connector.

21. The system of claim 1, wherein the temperature display is configured to be reset by an operator.

22. A system comprising:

an electrical connector comprising: an electrically insulating housing that defines an interior region and comprises an exterior surface; an electrically conductive shell on the exterior surface of the electrically insulating housing; an electrical conductor in the interior region; and a connection interface; wherein the electrical conductor is accessible through the connection interface; and a thermal sensing apparatus comprising:

a temperature sensor; and a temperature display visible from an exterior of the electrical connector, wherein the temperature display is configured to operate during and after the occurrence of a thermal event in which a rated temperature of the electrical conductor is exceeded, and the temperature display is configured to providing a persistent indication of a maximum temperature measured by the temperature sensor after the thermal event has ended and the temperature measured by the temperature sensor has decreased relative to the maximum temperature.

* * * * *